(12) United States Patent
Wohlert et al.

(10) Patent No.: US 10,084,608 B2
(45) Date of Patent: *Sep. 25, 2018

(54) METHOD AND SYSTEM FOR CONFIGURING INSTRUMENTATION DEVICES

(71) Applicant: AT&T INTELLECTUAL PROPERTY I, L.P., Atlanta, GA (US)

(72) Inventors: Randolph Wohlert, Austin, TX (US); Donald J. Bowen, Madison, NJ (US); Jeffrey P. Johnson, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 21 days.

This patent is subject to a terminal disclaimer.

(21) Appl. No.: 14/938,272

(22) Filed: Nov. 11, 2015

(65) Prior Publication Data

US 2016/0065382 A1 Mar. 3, 2016

Related U.S. Application Data

(63) Continuation of application No. 12/962,963, filed on Dec. 8, 2010, now Pat. No. 9,252,966.

(51) Int. Cl.
*H04L 12/28* (2006.01)

(52) U.S. Cl.
CPC ...... *H04L 12/2807* (2013.01); *H04L 12/2809* (2013.01); *H04L 12/2834* (2013.01); *H04L 12/2898* (2013.01)

(58) Field of Classification Search
CPC ............. H04L 12/2807; H04L 12/2809; H04L 12/2834

USPC .................................................. 709/223–226
See application file for complete search history.

(56) References Cited

U.S. PATENT DOCUMENTS

| | | |
|---|---|---|
| 6,286,038 B1 | 9/2001 | Reichmeyer et al. |
| 6,686,838 B1 | 2/2004 | Rezvani et al. |
| 6,874,028 B1 | 3/2005 | Feinleib et al. |
| 6,927,686 B2 | 8/2005 | Nieters et al. |
| 7,111,017 B1 | 9/2006 | Forood et al. |
| 7,243,147 B2 | 7/2007 | Hodges et al. |
| 8,255,932 B1 | 8/2012 | Clemm et al. |
| 8,290,818 B1 * | 10/2012 | Levitan .............. G06Q 30/0631 705/26.7 |
| 8,341,275 B1 | 12/2012 | Hesselink et al. |
| 9,378,664 B1 * | 6/2016 | Steckler .................... G09F 1/00 |
| 2002/0174264 A1 | 11/2002 | Fuller et al. |
| 2003/0033221 A1 * | 2/2003 | Fuwa ................... G06Q 10/087 705/26.2 |
| 2003/0069591 A1 * | 4/2003 | Carson ................. A61B 17/154 606/130 |
| 2003/0171113 A1 * | 9/2003 | Choi ................... H04L 12/2803 455/420 |

(Continued)

*Primary Examiner* — Minh Chau Nguyen
(74) *Attorney, Agent, or Firm* — Akerman LLP; Michael K. Dixon; Mammen (Roy) P. Zachariah, Jr.

(57) ABSTRACT

A method and system for managing an instrumentation device include accessing an image of the instrumentation device. Based on the image, an identity for the instrumentation device is determined. The identity is used to register the instrumentation device by configuring a gateway at a multimedia content distribution network client location to access and communicate with the instrumentation device. The identity of the instrumentation device and the gateway may be stored for future configuration of the gateway.

20 Claims, 8 Drawing Sheets

(56) References Cited

U.S. PATENT DOCUMENTS

| | | |
|---|---|---|
| 2004/0010327 A1 | 1/2004 | Terashima et al. |
| 2004/0024662 A1 | 2/2004 | Gray et al. |
| 2004/0199430 A1* | 10/2004 | Hsieh ............... G06Q 30/02 705/26.62 |
| 2004/0218801 A1* | 11/2004 | Houle ............... G06K 9/00154 382/137 |
| 2005/0026630 A1* | 2/2005 | Iso ................. G01C 21/3623 455/456.3 |
| 2005/0244082 A1 | 11/2005 | Yamatake |
| 2006/0041860 A1 | 2/2006 | Carmichael et al. |
| 2006/0067209 A1 | 3/2006 | Sheehan et al. |
| 2006/0077984 A1* | 4/2006 | Sakai ............... H04L 29/12066 370/395.52 |
| 2007/0017349 A1* | 1/2007 | Uehara ............... G10H 1/0008 84/609 |
| 2007/0151116 A1* | 7/2007 | Malandain ........... A61B 1/3135 33/512 |
| 2007/0192140 A1 | 8/2007 | Gropper |
| 2007/0197236 A1 | 8/2007 | Ahn et al. |
| 2007/0214300 A1 | 9/2007 | Anderson et al. |
| 2007/0232882 A1* | 10/2007 | Glossop ............. A61B 8/0841 600/407 |
| 2007/0236366 A1* | 10/2007 | Gur ................. G06K 9/00 340/945 |
| 2008/0004904 A1 | 1/2008 | Tran |
| 2008/0143538 A1 | 6/2008 | Young et al. |
| 2008/0169343 A1* | 7/2008 | Skaaksrud ........... G06Q 10/08 235/376 |
| 2009/0086688 A1 | 4/2009 | Kvache et al. |
| 2009/0177378 A1 | 7/2009 | Kamalski et al. |
| 2009/0243852 A1 | 10/2009 | Haupt et al. |
| 2009/0265747 A1 | 10/2009 | Li |
| 2009/0324029 A1* | 12/2009 | Araikum ............. G06T 5/003 382/128 |
| 2010/0029253 A1* | 2/2010 | Han ................. H04L 12/2803 455/414.2 |
| 2010/0219250 A1 | 9/2010 | Wang |
| 2010/0257083 A1 | 10/2010 | Pfeffer |
| 2011/0149720 A1 | 6/2011 | Phuah et al. |
| 2011/0161112 A1* | 6/2011 | Keefe ............... G06Q 50/22 705/3 |
| 2012/0020563 A1* | 1/2012 | Amir ................ G06K 9/3266 382/182 |
| 2012/0102558 A1 | 4/2012 | Muraki |
| 2012/0281095 A1* | 11/2012 | Trenciansky ......... G06Q 10/00 348/159 |
| 2013/0187953 A1 | 7/2013 | Matsumura et al. |

\* cited by examiner

METHOD AND SYSTEM FOR CONFIGURING INSTRUMENTATION DEVICES

CROSS REFERENCE TO RELATED APPLICATIONS

This application is a continuation of and claims the benefit of U.S. application Ser. No. 12/962,963, filed Dec. 8, 2010, which is hereby incorporated by reference in its entirety.

FIELD OF THE DISCLOSURE

The present disclosure relates to configuring instrumentation devices and, more particularly, to configuring instrumentation devices based on a captured image.

BACKGROUND

A number of instrumentation devices and systems have become widely available to the average consumer, including devices for home security, energy management, automation control, telemetry, and health monitoring, among other applications. Many consumers may find available methods for configuration of instrumentation devices to be cumbersome and difficult to perform. The inconvenience associated with using new instrumentation devices with existing computer and network resources may result in consumer frustration and may pose a barrier to widespread consumer adoption.

DESCRIPTION OF EMBODIMENTS

In one aspect, a disclosed method for managing an instrumentation device includes accessing an image of the instrumentation device and, based on the image, determining an identity for the instrumentation device. The method may further include registering the instrumentation device by associating the identity with a client premises gateway. The gateway may be part of a multimedia content distribution network (MCDN) and may be configured to access the instrumentation device. The instrumentation device may include a home security device, an energy monitoring device, a medical device, a sensor, a transducer, an actuator, or a combination thereof.

In some embodiments, the method may include storing the identity of the instrumentation device and associating the stored identity with an MCDN user account associated with the gateway. The storing and associating operations may be performed by an MCDN server. The associating operation may include configuring the gateway with a communication address for accessing the instrumentation device. The operation of accessing the image may include receiving the image from an imaging device that has captured an image of the instrumentation device. Receiving the image may occur over a wireless network. In some embodiments, the image may be received via a network connection other than a network connection between the MCDN and the client premises and from a location other than a location of the MCDN client premises.

In another aspect, a system for managing an instrumentation device is disclosed. The disclosed system includes a processor coupled to memory media. The memory media may include processor executable instructions to access an image. The accessed image may include an indication of the instrumentation device, captured by an imaging device. Based on the indication, the method may determine an identity for the instrumentation device. The memory processor executable instructions may include instructions to associate the identity with a gateway of MCDN. The gateway may be configured to communicate with the instrumentation device. The indication may include information specifying the identity of the instrumentation device, such as a bar code, a serial number, a model number, a device identifier, a quick response code, a bokeh-effect element, or various combinations thereof.

In another aspect, a disclosed computer-readable memory media includes executable instructions for managing an instrumentation device. The instructions may be executable to access an image of the instrumentation device captured by an imaging device, and, based on the image, determine an identity for the instrumentation device. The memory media may include instructions executable to store the identity of the instrumentation device at an MCDN server. The identity for the instrumentation device may specify a model descriptor for a type of instrumentation device.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

Figure 1:
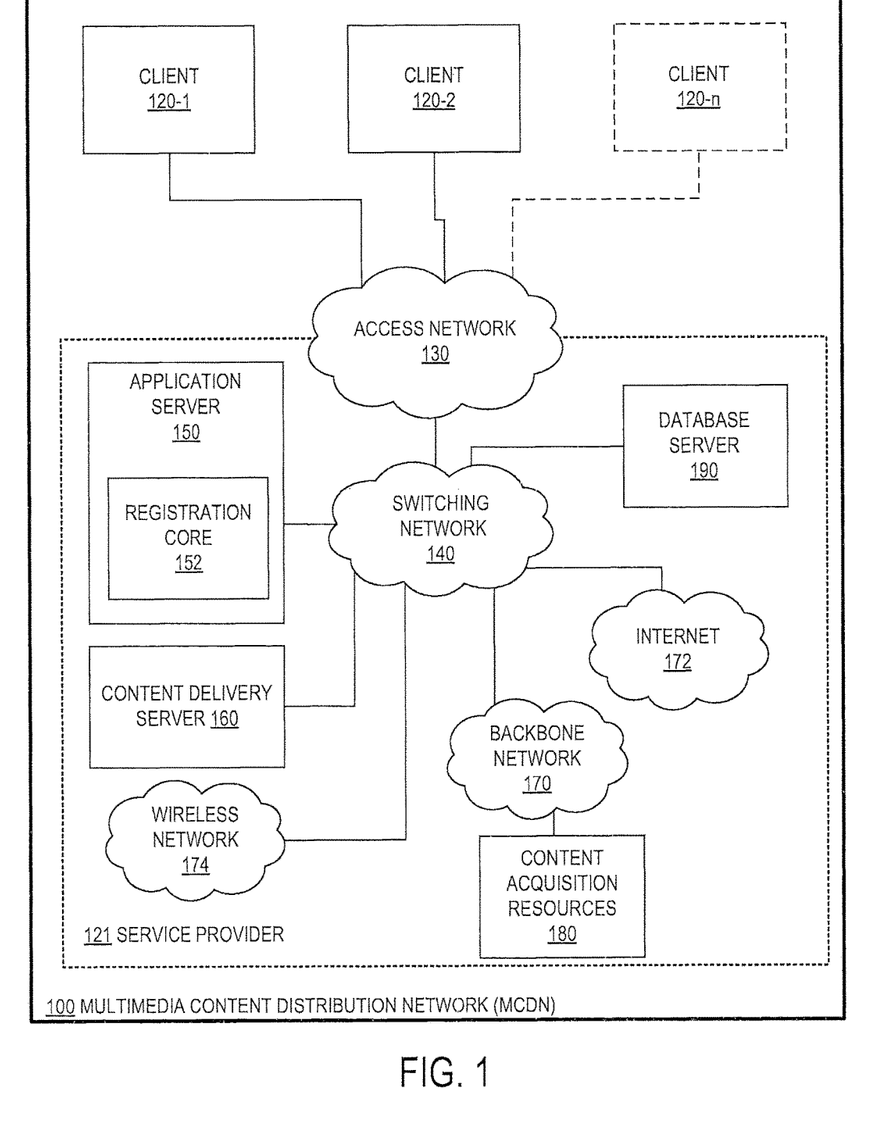
FIG. 1 is a block diagram of selected elements of an embodiment of a multimedia content distribution network (MCDN)

Turning now to the drawings, FIG. 1 is a block diagram illustrating selected elements of an embodiment of an MCDN 100, including registration core 152, which, as will be described in detail below, may be used to configure consumer instrumentation devices. As used herein, an "instrumentation device" may include devices used for home security, energy management, automation control, telemetry, and health monitoring, among other applications. Thus, an instrumentation device may refer a home security device, an energy monitoring device, a medical device, a sensor, a transducer, an actuator, or combinations thereof.

An instrumentation device may be an active or a passive device with respect to energy consumption (i.e., powered or unpowered). An instrumentation device may also include (or accommodate) processing capability for, but not limited to, signal processing, signal conditioning, communication, encryption, decryption, encoding, decoding, computation, measurement, display, adjustment, calibration, tuning, and synchronization, among other features.

The elements of MCDN 100 illustrated in FIG. 1 emphasize network elements with functionality for delivering multimedia content to a set of one or more "subscribers" (also referred to herein as "MCDN users," "end users," or simply "users"). It is noted that different embodiments of MCDN 100 may include additional elements or systems (omitted from FIG. 1 for clarity) such as data processing systems for billing, content management, customer support, operational support, or other business applications. Although multimedia content is not limited to TV, video on demand (VOD), or pay-per-view (PPV) programs, the depicted embodiments of MCDN 100 and its capabilities are primarily described herein with reference to these types of multimedia content, which are interchangeably referred to herein as "multimedia content", "multimedia content programs", "multimedia programs" or, simply, "programs."

As depicted in FIG. 1, MCDN 100 includes one or more clients 120 and a service provider 121. Each client 120 may represent a different subscriber of MCDN 100. In FIG. 1, a plurality of n clients 120 is depicted as client 120-1, client 120-2 to client 120-n, where n may be a large number. Service provider 121 as depicted in FIG. 1 encompasses resources to acquire, process, and deliver programs to clients 120 via access network 130. Such elements in FIG. 1 of service provider 121 include content acquisition resources 180 connected to switching network 140 via backbone network 170, as well as application server 150, database server 190, and content delivery server 160, also shown connected to switching network 140.

Access network 130 demarcates clients 120 and service provider 121, and provides at least one connection path between clients 120 and service provider 121. In some embodiments, access network 130 is an Internet protocol (IP) compliant network. In some embodiments, access network 130 includes a physical layer or media. The physical layer may include, as examples, twisted pair copper wiring, fiber optic cabling, coaxial cabling or a combination thereof. It is noted that in some embodiments of MCDN 100, access network 130 is owned and/or operated by service provider 121. In other embodiments, a third party may own and/or operate at least a portion of access network 130.

MCDN 100 may include digital connections between clients 120 and a node (see also FIG. 4) in access network 130 while fiber, cable, or another broadband medium connects service provider resources to the node. In other embodiments, the broadband cable may extend all the way to clients 120. In certain embodiments, fiber optic cables may extend from the node in access network 130 to each individual client 120. The connections between access network 130 and clients 120 may include digital subscriber line (DSL) connections. In particular embodiments, the connections may be DSL-compliant twisted pair or another type of galvanic loop (see also FIG. 4).

In some embodiments, switching network 140 provides connectivity for service provider 121, and may be housed in a central office or other facility of service provider 121. Switching network 140 may provide firewall and routing functions to demarcate access network 130 from the resources of service provider 121. In embodiments that employ DSL-compliant connections, switching network 140 and/or access network 130 may include elements of a DSL access multiplexer (DSLAM) that multiplexes many subscriber DSLs to backbone network 170 (see also FIG. 4).

In FIG. 1, backbone network 170 represents a private network including, as an example, a fiber based network to accommodate high data transfer rates. Content acquisition resources 180 as depicted in FIG. 1 encompass systems for acquiring various types of content including broadcast content, other "live" content including PPV and other national content feeds, and VOD content.

Thus, the content provided by service provider 121 encompasses multimedia content that is scheduled in advance for viewing by clients 120 via access network 130. Such multimedia content, also referred to herein as "scheduled programming," may be selected using an electronic programming guide (EPG), such as EPG 316 described below with respect to FIG. 3. Accordingly, a user of MCDN 100 may be able to browse scheduled programming well in advance of the broadcast date and time. Some scheduled programs may be "regularly" scheduled programs, which recur at regular intervals or at the same periodic date and time (i.e., daily, weekly, monthly, etc.). Programs which are broadcast at short notice or interrupt scheduled programs are referred to herein as "unscheduled programming."

Acquired content is provided to content delivery server 160 via backbone network 170 and switching network 140. Content may be delivered from content delivery server 160 to clients 120 via switching network 140 and access network 130. Content may be compressed, encrypted, modulated, demodulated, and otherwise encoded or processed at content acquisition resources 180, content delivery server 160, or both. Although FIG. 1 depicts a single element encompassing acquisition of all content, different types of content may be acquired via different types of acquisition resources. Similarly, although FIG. 1 depicts a single content delivery server 160, different types of content may be delivered by different servers. Moreover, embodiments of MCDN 100 may include content acquisition resources in regional offices that are connected to switching network 140.

Although service provider 121 is depicted in FIG. 1 as having switching network 140 to which content acquisition resources 180, content delivery server 160, and application server 150 are connected, other embodiments may employ different switching networks for each of these functional components and may include additional functional components (not depicted in FIG. 1) including, for example, operational subsystem support (OSS) resources.

FIG. 1 also illustrates application server 150 connected to switching network 140. As suggested by its name, application server 150 may host or otherwise implement one or more applications for MCDN 100. Application server 150 may be any data processing system with associated software that provides applications for clients or users. Application server 150 may provide services including multimedia content services, e.g., EPGs, digital video recording (DVR) services, VOD programs, PPV programs, IPTV portals, digital rights management (DRM) servers, navigation/middleware servers, conditional access systems (CAS), and remote diagnostics, as examples.

Applications provided by application server 150 may be downloaded and hosted on other network resources including, for example, content delivery server 160, switching network 140, and/or on clients 120. Application server 150 is configured with a processor and storage media (not shown in FIG. 1) and is enabled to execute processor instructions, such as those included within a software application. As depicted in FIG. 1, application server 150 may be configured to include various applications (not shown in FIG. 1) that may provide functionality to clients 120.

Further depicted in FIG. 1 is database server 190, which provides hardware and software resources for data warehousing. Database server 190 may communicate with other elements of service provider 121, such as application server 150 or content delivery server 160, in order to store and provide access to large volumes of data, information, or multimedia content. In some embodiments, database server 190 includes a data warehousing application, accessible via switching network 140, that can be used to record and access structured data, such as program or channel metadata for clients 120. Database server 190 may also store device information, such as identifiers for client 120, model identifiers for remote control devices, identifiers for peripheral devices, etc.

Also shown in FIG. 1 is wireless network 174, which may be coupled to switching network 140. Wireless network 174 may represent a wireless communications network for providing wireless service to a plurality of wireless user devices (not shown in FIG. 1). Although shown as coupled to switching network 140, wireless network 174 may be an external network and may be configured to operate autonomously to MCDN 100. In certain embodiments, service provider 121 may own and/or operate both MCDN 100 and wireless network 174. It is further noted that access to wireless network 174 may be provided at client 120 via access network 130, as will be described in additional detail herein. Examples of wireless network 174 include cellular telephony networks and wireless wide area networks (WWAN).

In FIG. 1, Internet 172 is representative of any public network accessible via switching network 130. Access to Internet 172 may encompass publication of websites, web pages, and web applications that may be invoked using a universal resource locator (URL), such as an Internet web address. A web browser or similar application may be used to access a published website using an Internet user device (not shown in FIG. 1). In certain implementations, application server 150 and/or database server 190 may be configured to host web servers (not shown in FIG. 1) accessible via Internet 172, whereby the web servers provide functionality for publishing websites and managing various URLs related thereto. It is noted that websites published using MCDN 100 may provide controlled access based on an MCDN client account associated with individual client 120. Client-specific websites may thus enable client-specific information and/or communication channels to be made available by MCDN 100 via Internet 172.

Also shown in FIG. 1 is registration core 152, which is depicted as an application hosted by application server 150. As will be described and depicted in further detail herein, registration core 152 may represent centralized functionality for managing consumer instrumentation devices. When the consumer is an MCDN user, or has access to an MCDN user account, the consumer may wish to integrate certain instrumentation devices located in or otherwise associated with client 120. The consumer may also desire to use an instrumentation device with functionality provided by MCDN 100. Registration core 152 may be configured to identify a consumer's instrumentation device and configure equipment at client 120 to recognize and communicate with the instrumentation device. More broadly, registration core 152 may operate in various functional scenarios spanning from interaction with a point-of-sale (POS) system for preconfiguration to data recovery and reconfiguration after service interruptions.

Figure 2:
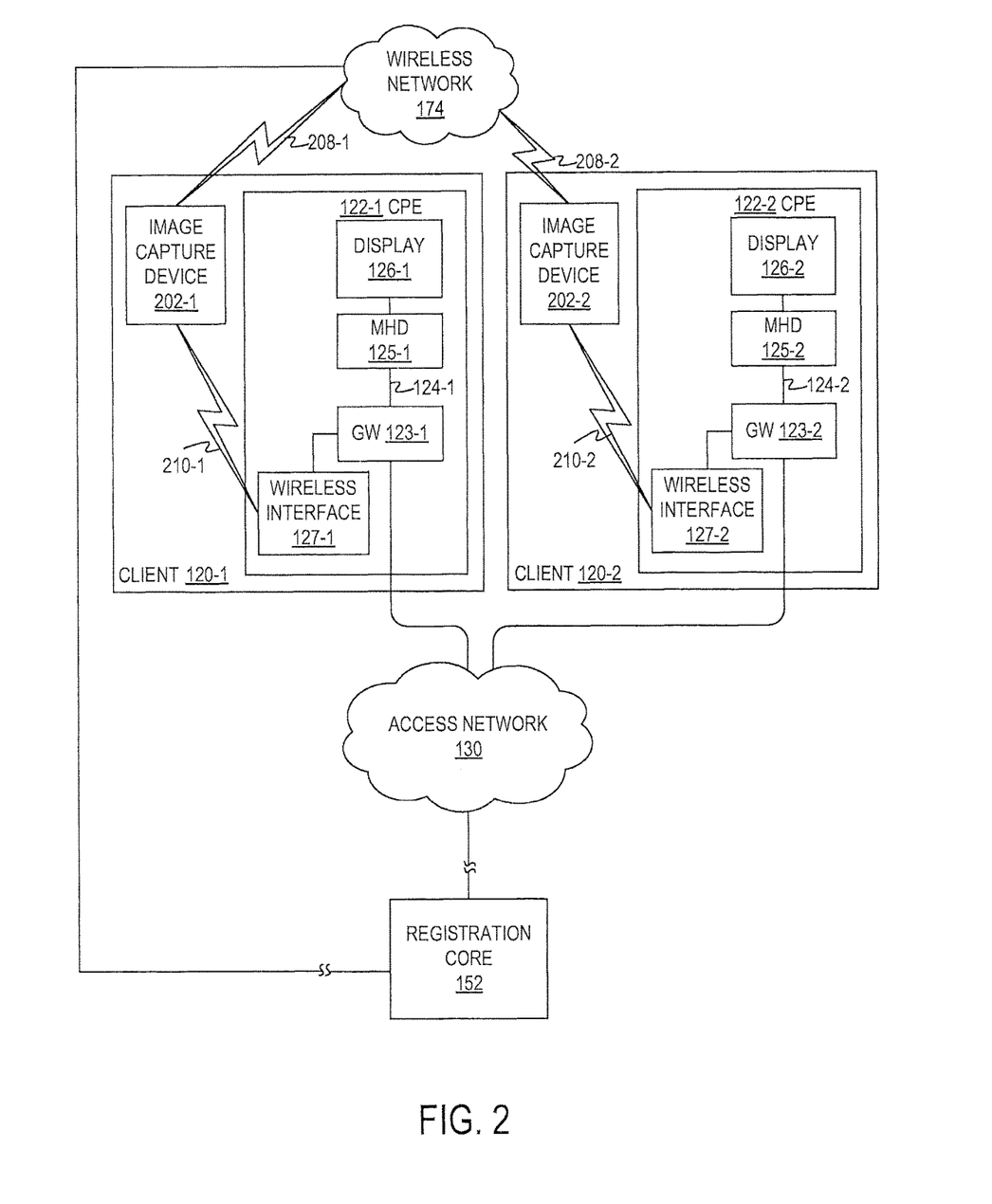
FIG. 2 is a block diagram of selected elements of the MCDN of FIG. 1 illustrating additional detail for the MCDN clients.

Turning now to FIG. 2, clients 120 are shown in additional detail with respect to access network 130 and wireless network 174, through either of which clients 120 may be linked to registration core 152 (see also FIG. 1). Clients 120 may include network appliances collectively referred to herein as customer premises equipment (CPE) 122. In the depicted embodiment, CPE 122 includes the following devices: wireless interface 127, gateway (GW) 123, MHD 125, and display device 126. Any combination of GW 123, MHD 125, and display device 126 may be integrated into a single physical device. Thus, for example, CPE 122 might include a single physical device that integrates GW 123, MHD 125, and display device 126. As another example, MHD 125 may be integrated into display device 126, while GW 123 is housed within a physically separate device.

In FIG. 2, GW 123 provides connectivity between client 120 and access network 130. GW 123 may, for example, provide an interface and conversion function between access network 130 and client-side local area network (LAN) 124. GW 123 may include elements of a conventional DSL or cable modem. GW 123, in some embodiments, may further include routing functionality for routing multimedia content, conventional data content, or a combination of both in compliance with IP and/or another network layer protocol. GW 123 may also provide a firewall (not depicted) between clients 120 and access network 130.

In some embodiments, LAN 124 may encompass or represent an IEEE 802.3 (Ethernet) LAN, an IEEE 802.11-type (WiFi) LAN, or a combination thereof. Accordingly, GW 123 may still further include WiFi or another type of wireless access point to extend LAN 124 to wireless-capable devices in proximity to GW 123. Wireless interface 127 may also represent such a wireless access point coupled to GW 123 that, for example, provides access to image capture device 202 via wireless LAN 210. It is noted that wireless interface 127 may provide access to other devices, such as consumer instrumentation devices (see also FIGS. 3, 4).

Clients 120 as depicted in FIG. 2 include a display device or, more simply, a display 126. Display 126 may be implemented as a TV, a liquid crystal display screen, a computer monitor, or the like. Display 126 may comply with a display standard for computer monitors and/or television displays. Standards for computer monitors include analog standards such as video graphics array (VGA), extended graphics array (XGA), etc., or digital standards such as digital visual interface (DVI) and high definition multimedia interface (HDMI), among others. A television display may comply with standards such as National Television System Committee (NTSC), Phase Alternating Line (PAL), or another suitable standard. Display 126 may include one or more integrated speakers to play audio content.

MHD 125 is enabled and configured to process incoming multimedia signals to produce audio and visual signals suitable for delivery to display 126 and any optional external speakers (not depicted in FIG. 2). Incoming multimedia signals received by MHD 125 may be compressed and/or encrypted, digital or analog, packetized for delivery over packet-switched embodiments of access network 130 or modulated for delivery over cable-based access networks. In some embodiments, MHD 125 may be implemented as a stand-alone set top box suitable for use in a co-axial or IP-based MCDN.

MHD 125 may be operable to communicate requests or commands wirelessly to a remote control device (not shown in FIG. 2), which may employ infrared (IR) or radio frequency (RF) signals. It is noted that MHDs 125 may also receive requests or commands via buttons (not depicted) located on side panels of MHDs 125. For example, a local transceiver may provide a direct communication link between MHD 125 and a remote control device. MHD 125 may be a functional component of CPE 122 along with GW 123 and display 126, independent of any physical implementation. In particular, it is noted that CPE 122 may be any combination of GW 123, MHD 125 and display 126.

MHD 125 may include a processor coupled to storage media (not shown in FIG. 2). MHD 125 may further include a network adapter (not shown in FIG. 2) that interfaces MHD 125 to LAN 124 and through which MHD 125 receives multimedia content from access network 130. GW 123 is shown providing a bridge between access network 130 and LAN 124, and is configured to receive multimedia content (not shown) from access network 130. The storage media included in MHD 125 may be memory media (not shown) that encompasses persistent and volatile media, fixed and removable media, and magnetic and semiconductor media, and may be operable to store instructions, data, or both. The memory media included in MHD 125 may include sets or sequences of instructions and/or data, namely, an operating system and an EPG (not shown in FIG. 2). The operating system (not shown) may be a UNIX or UNIX-like operating system, a Windows® family operating system, or another suitable operating system. In some embodiments, the memory media (not shown) is configured to store and execute instructions provided as services to client 120 by application server 150, as mentioned previously.

The EPG may represent a guide to the multimedia content provided to client 120 via MCDN 100, and may be shown to the user as an element of an MHD user interface (not shown in FIG. 2) on display 126. The MHD user interface may include a plurality of menu items arranged according to one or more menu layouts, which enable a user to operate MHD 125. The user may operate the MHD user interface, including the EPG, using the remote control device.

Also shown in FIG. 2 at client 120 is image capture device 202, which may represent a consumer device with imaging capability (e.g., a camera). The imaging capability may include still and/or video images. In various embodiments, image capture device 202 may represent a mobile telephony device with integrated imaging capability, such as a cellular telephone, smart phone, or other types of devices, such as media players, music players, or network access devices. Image capture device 202 may also be a portable computer or a personal computer configured with imaging capability. In some embodiments, image capture device 202 may represent a camera configured to export a captured image, either via a network connection or a memory media or both. It is noted that image capture device 202 may include processing capability to store and/or perform computational operations, such as image processing and image recognition, among other operations.

As shown in the exemplary embodiment of FIG. 2, image capture device 202 may include an interface for communicating via wireless link 208 with wireless network 174, which, as noted above, may be a cellular telephony network or a WWAN. Thus, since wireless network 174 may also provide connectivity to registration core 152 (see also FIG. 1), image capture device 202 may be operable with various network pathways to interact with registration core 152. Wireless network 174 and registration core 152 may be configured to provide instrumentation device management services to a plurality of image capture devices 202 at a plurality of clients 120. It is noted that while image capture device 202 is depicted as being located within client 120, wireless link 208 may afford image capture device 202 the capability of communicating with registration core 152 at locations than at client 120. Furthermore, in various embodiments, image capture device 202 may represent a device owned and/or operated by a party other than the consumer (not shown in FIG. 2) or service provider 121 (see FIGS. 1, 5).

Figure 3:
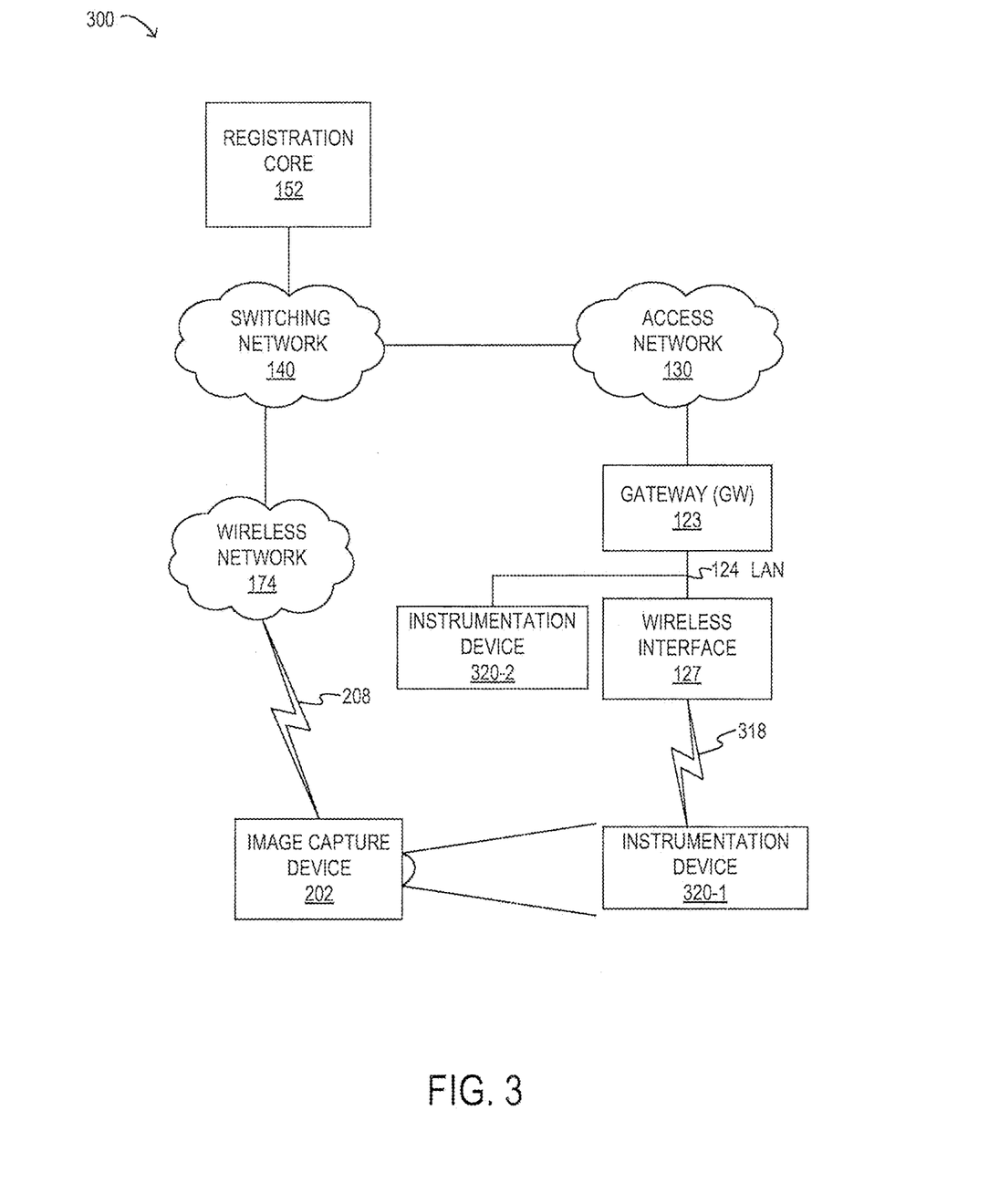
FIG. 3 is a block diagram of selected elements of an embodiment of an instrumentation device management system.

Referring now to FIG. 3, a block diagram illustrating selected elements of a different embodiment of instrumentation device management system 300 is presented. In FIG. 3, instrumentation device management system 300 is shown including various elements in an exemplary implementation for descriptive purposes. Other implementations may be used in different embodiments (see also FIGS. 4, 5). It is noted that in instrumentation device management system 300, GW 123, LAN 124, wireless interface 127, wireless LAN 318, instrumentation devices 320, and image capture device 202 may be assumed to be at an MCDN client location, which is served by access network 130 and wireless network 174 (via wireless link 208).

In FIG. 3, image capture device 202 includes an optical camera configured to capture an image (not shown) of instrumentation device 320-1. A consumer (not shown) may desire to configure or otherwise access instrumentation device 320-1 via wireless LAN 318 provided by wireless interface 127. Wireless interface 127 may, in turn, be connected via LAN 124 to GW 123. Instrumentation device 320-2 may represent a second device, which is configured for use via LAN 124, and whose image may also be captured (not shown in FIG. 3) by optical camera 322. As shown in FIG. 3, access network 130 and/or wireless network 174 may reach registration core 152 via switching network 140 (see also FIG. 1). In exemplary instrumentation device management system 300, image capture device 202 may access registration core 152 using wireless link 208 to access wireless network 174.

In operation of instrumentation device management system 300, an MCDN user (e.g., the consumer) may desire to configure instrumentation device 320-1 for use with GW 123. More specifically, the MCDN user may desire to use instrumentation device 320-1 with a computing device (not shown in FIG. 3) coupled to LAN 124, and which may execute instructions to operate instrumentation device 320-1. For at least this reason, GW 123 may be configured to communicate with instrumentation device 320-1. However, GW 123 may initially be unaware of instrumentation device 320-1 and, absent communication with instrumentation device 320-1, may not be able to correctly identify instrumentation device 320-1. Such an installation quandary may be a cause of significant inconvenience for the MCDN user.

According to methods presented herein, the MCDN user may use image capture device 202 to capture an image of instrumentation device 320-1. The image may be sent to registration core 152, which may be configured to receive the image. Registration core 152 may further be configured to identify the MCDN user or an MCDN user account associated with the MCDN user. Based on the image, an identity of instrumentation device 320-1 may be determined by registration core 152. In certain embodiments, image capture device 202 may itself be configured to determine the identity based on the image and send an indication of the identity (for example, instead of the image) to registration core 152. The identity may be used by registration core 152 to obtain (or reference) configuration information for instrumentation device 320-1, such as communication commands and/or parameters specific to instrumentation device 320-1. The identity and/or the configuration information may then be associated by registration core 152 with GW 123, which is associated with the MCDN user (or the MCDN user account). In conjunction with associating the identity and/or the configuration information with GW 123, GW 123 may be configured to communicate with instrumentation device 320-1. This process may be referred to as "registering" instrumentation device 320-1.

In certain embodiments of instrumentation device management system 300, registration core 152 may further be configured to store information associated with instrumentation device 320-1 and the MCDN user. Information associated with instrumentation device 320-1 may include the identity of instrumentation device 320-1 (or an indication thereof), and configuration information for instrumentation device 320-1, among other information. Information associated with the MCDN user may include an MCDN user account identifier, a network address, a telephone address, a gateway identifier, and personal consumer information, among other information. It is noted that registration core 152 may employ database server 190 (see FIG. 1) or another storage repository for storing information. After storing the information, registration core 152 may be configured to reconfigure GW 123 (or another device) via access network 130, when desired. For example, the MCDN user (not shown in FIG. 3) may receive a replacement device for GW 123 that does not include the configuration information for instrumentation device 320-1. In this situation, registration core 152 may provide functionality for invoking a reconfiguration of a previously configured instance of instrumentation device 320-1.

Figure 4:
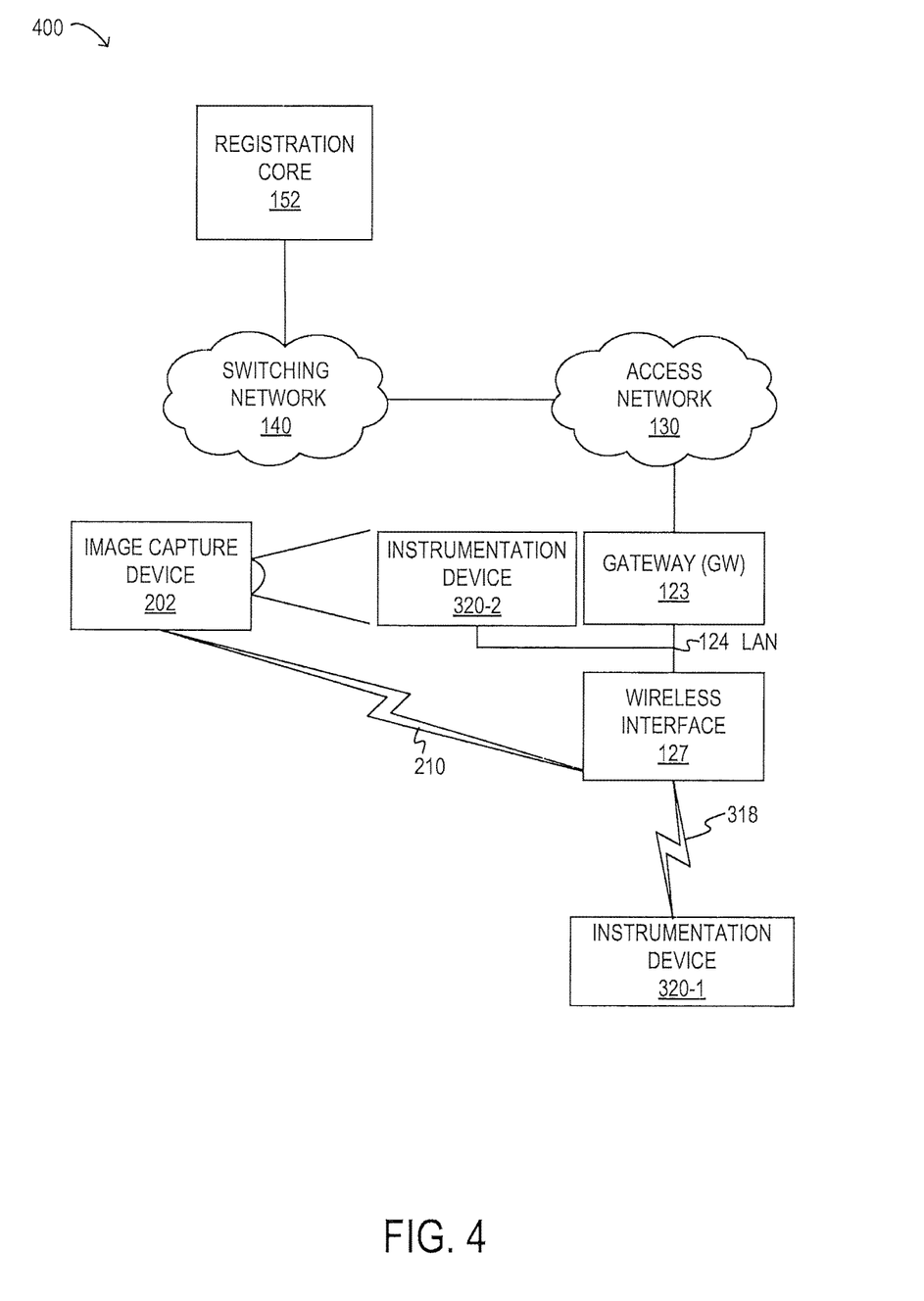
FIG. 4 is a block diagram of selected elements of a second embodiment of an instrumentation device management system.

Turning now to FIG. 4, a block diagram illustrating selected elements of an embodiment of instrumentation device management system 400 is depicted. It is noted that elements in FIG. 4 represent like-numbered elements discussed above with respect to FIGS. 1-3. In FIG. 4, instrumentation device management system 400 is shown including various elements in an exemplary implementation for descriptive purposes. Other implementations may be used in different embodiments (see also FIGS. 3, 5). It is noted that in instrumentation device management system 400, GW 123, LAN 124, wireless interface 127, wireless LAN 318, instrumentation devices 320, and image capture device 202 may be assumed to be at an MCDN client location, which is served by access network 130 and for which wireless interface 127 provides wireless LAN service (318, 210).

In FIG. 4, image capture device 202 is configured to capture an image (not shown) of instrumentation device 320-2. A consumer (not shown) may desire to use instrumentation device 320-2 via LAN 124. Instrumentation device 320-1 may represent a second device, which is configured for use via wireless LAN 318, and whose image may also be captured (not shown in FIG. 3) by optical camera 322. As shown in FIG. 4, access network 130 may reach registration core 152 via switching network 140 (see also FIG. 1). In exemplary instrumentation device management system 400, image capture device 202 may access registration core 152 using wireless LAN 210 to access wireless interface 127 locally at the MCDN client location. In certain embodiments, wireless LAN 210 and 318 may represent the same type of wireless LAN. It is noted that in other embodiments (not shown in FIG. 4), LAN 124 may be substituted for wireless LAN 210, such that image capture device 202 is coupled to LAN 124.

In operation of instrumentation device management system 400, an MCDN user (e.g., the consumer) may desire to configure instrumentation device 320-2 for use with GW 123. More specifically, the MCDN user may desire to use instrumentation device 320-2 with a computing device (not shown in FIG. 3) coupled to LAN 124, and which may execute instructions to operate instrumentation device 320-2. For at least this reason GW 123 may be configured to communicate with instrumentation device 320-2. However, GW 123 may initially be unaware of instrumentation device 320-2 and, absent communication with instrumentation device 320-2, may not be able to correctly identify instrumentation device 320-2.

According to methods presented herein, the MCDN user may use image capture device 202 to capture an image of instrumentation device 320-2. The image may be sent to registration core 152, which may be configured to receive the image. Registration core 152 may be configured to identify the MCDN user, or an MCDN user account associated with the MCDN user. Based on the image, an identity of instrumentation device 320-2 may be determined by registration core 152. In certain embodiments, image capture device 202 may itself be configured to determine the identity based on the image and send an indication of the identity (for example, instead of the image) to registration core 152. The identity may be used by registration core 152 to obtain (or reference) configuration information for instrumentation device 320-2, such as communication commands and/or parameters specific to instrumentation device 320-2. The identity and/or the configuration information may then be associated by registration core 152 with GW 123, which is associated with the MCDN user (or the MCDN user account). In conjunction with associating the identity and/or the configuration information with GW 123, GW 123 may be configured to communicate with instrumentation device 320-2. This process may also be referred to as "registering" instrumentation device 320-2.

In certain embodiments of instrumentation device management system 400, registration core 152 may be configured to store information associated with instrumentation device 320-2 and the MCDN user. Information associated with instrumentation device 320-2 may include the identity of instrumentation device 320-2 (or an indication thereof), and configuration information for instrumentation device 320-2, among other information. Information associated with the MCDN user may include an MCDN user account identifier, a network address, a telephone address, a gateway identifier, and personal consumer information, among other information. It is noted that registration core 152 may employ database server 190 (see FIG. 1) or another storage repository for storing information. After storing the information, registration core 152 may be configured to reconfigure GW 123 (or another device) via access network 130, when desired. For example, the MCDN user (not shown in FIG. 3) may receive a replacement device for GW 123 that does not include the configuration information for instrumentation device 320-2. In this situation, registration core 152 may provide functionality for invoking a reconfiguration of a previously configured instance of instrumentation device 320-2.

Figure 5:
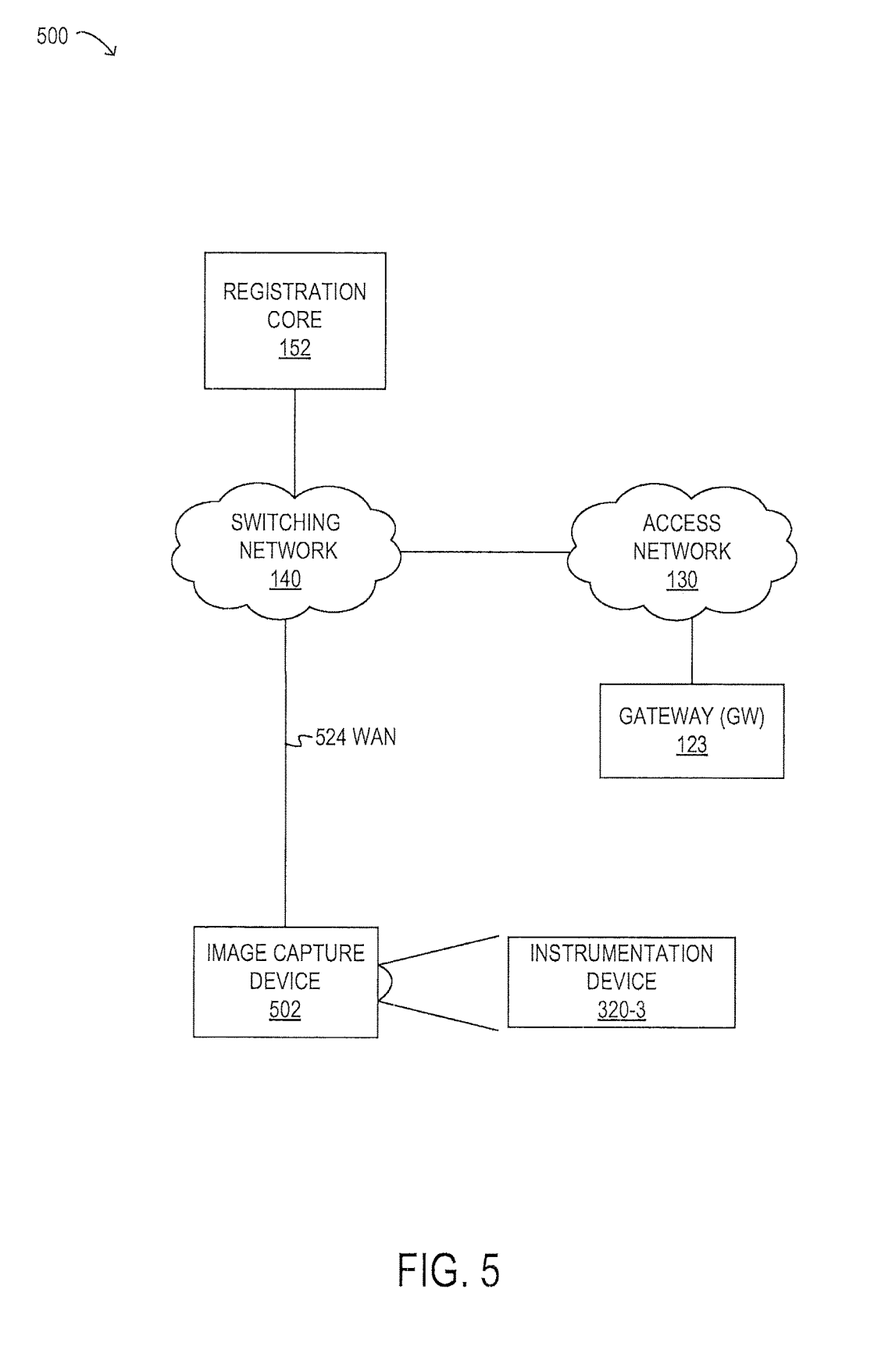
FIG. 5 illustrates selected elements of a third embodiment of an instrumentation device management system.

Turning now to FIG. 5, a block diagram illustrating selected elements of an embodiment of instrumentation device management system 500 is depicted. It is noted that elements in FIG. 5 represent like-numbered elements discussed above with respect to FIGS. 1-4. In FIG. 5, instrumentation device management system 500 is shown including various elements in an exemplary implementation for descriptive purposes. Other implementations may be used in different embodiments (see also FIGS. 3, 4). It is noted that in instrumentation device management system 500, GW 123 may be assumed to be at an MCDN client location, which is served by access network 130.

In instrumentation device management system 500, image capture device 502 and instrumentation device 320-3 may be assumed to be at a location different from the MCDN client location. One such different location may be at a POS for instrumentation device 320-3. It is further noted that, in various embodiments of instrumentation device management system 500, image capture device 502 may be owned and/or operated by an entity other than the MCDN user or service provider 121 (see FIG. 1). For example, a seller of instrumentation device 320-3 may own and operation image capture device 502 along with a POS system for the purposes of preconfiguring GW 123 according to the methods described herein on behalf of the MCDN user purchasing instrumentation device 320-3.

In FIG. 5, image capture device 502 is configured to capture an image (not shown) of instrumentation device 320-3. A consumer (not shown) may desire to use instrumentation device 320-3 via GW 123, in a similar manner as described previously with respect to FIGS. 3 and 4. As shown in FIG. 5, access network 130 may reach registration core 152 via switching network 140 (see also FIG. 1). In exemplary instrumentation device management system 500, image capture device 502 may access registration core 152 using WAN 524 via switching network 140. WAN 524 may include various fixed and wireless network segments, including configurations described above with respect to FIGS. 3 and 4, among others.

In operation of instrumentation device management system 500, an MCDN user (e.g., the consumer) may desire to purchase instrumentation device 320-3 for use with GW 123. More specifically, the MCDN user may desire to use instrumentation device 320-3 with a computing device (not shown in FIG. 3) coupled to GW 123, and which may execute instructions to operate instrumentation device 320-3. For at least this reason, it is desirable that GW 123 be configured to communicate with instrumentation device 320-3. A seller (not shown in FIG. 5) of instrumentation device 320-3 may, on behalf of the purchasing MCDN user, preconfigure GW 123 for communication with instrumentation device 320-3, prior to the introduction of instrumentation device 320-3 to GW 123. Thus, in instrumentation device management system 500, when the MCDN user arrives at the MCDN client premises with new instrumentation device 320-3, GW 123 may already be configured to communicate with instrumentation device 320-3. It is noted that while a single instance of instrumentation device 320-3 is shown for clarity in FIG. 5, instrumentation device management system 500 may be used to configure a plurality or a set of various instrumentation devices (not shown in FIG. 5).

According to methods presented herein, a POS system (not shown in FIG. 5) may use image capture device 502 to capture an image of instrumentation device 320-3. The image may be sent to registration core 152, which may be configured to receive the image. Registration core 152 may be configured to identify the MCDN user, or an MCDN user account associated with the MCDN user. Based on the image, an identity of instrumentation device 320-3 may be determined by registration core 152. In certain embodiments, image capture device 502, or another component of the POS system, may itself be configured to determine the identity based on the image and send an indication of the identity (for example, instead of the image) to registration core 152. The identity may be used by registration core 152 to obtain (or reference) configuration information for instrumentation device 320-3, such as communication commands and/or parameters specific to instrumentation device 320-3. The identity and/or the configuration information may then be associated by registration core 152 with GW 123, which is associated with the MCDN user (or the MCDN user account). In conjunction with associating the identity and/or the configuration information with GW 123, GW 123 may be configured to communicate with instrumentation device 320-3. This process may be also referred to as "registering" instrumentation device 320-3.

In certain embodiments of instrumentation device management system 500, registration core 152 may further be configured to store information associated with instrumentation device 320-3 and the MCDN user. Information associated with instrumentation device 320-3 may include the identity of instrumentation device 320-3 (or an indication thereof), and configuration information for instrumentation device 320-3, among other information. Information associated with the MCDN user may include an MCDN user account identifier, a network address, a telephone address, a gateway identifier, and personal consumer information, among other information. It is noted that registration core 152 may employ database server 190 (see FIG. 1) or another storage repository for storing information. After storing the information, registration core 152 may be configured to reconfigure GW 123 (or another device) via access network 130, when desired. For example, the MCDN user (not shown in FIG. 3) may receive a replacement device for GW 123 that does not include the configuration information for instrumentation device 320-3. In this situation, registration core 152 may provide functionality for invoking a reconfiguration of a previously configured instance of instrumentation device 320-3.

Figure 6:
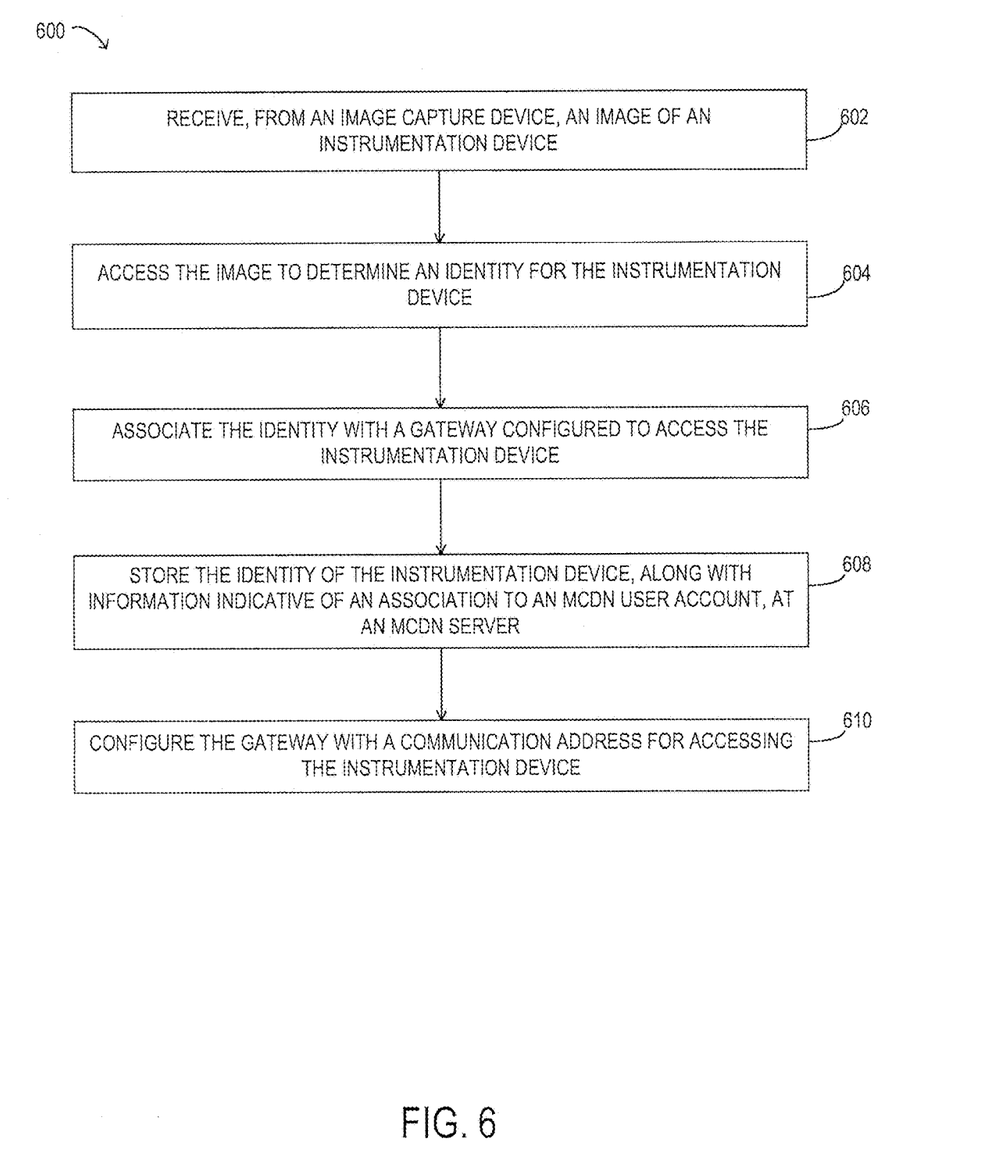
FIG. 6 illustrates selected elements of an embodiment of an instrumentation device management method.

Turning now to FIG. 6, selected elements of an embodiment of a method 600 for instrumentation device management are illustrated in flow chart form. In one embodiment, method 600 may be performed by registration core 152 (see FIGS. 1, 2) in conjunction with MCDN 100 and image capture device 202, 502 (see FIGS. 3-5). Method 600 may also involve functionality provided by instructions 824 executing on computing device 800 (see FIG. 8). It is noted that certain operations described in method 600 may be optional or may be rearranged in different embodiments.

In the depicted embodiment, method 600 receives (operation 602) an image of an instrumentation device from an image capture device. The image capture device may have previously captured the image. The image may include a representation of an identifier for the instrumentation device, such as a bar code, a quick response code, or a bokode, among others. A bokode is a type of bokeh-effect element that may provide information similar to a bar code. The image may then be accessed (operation 604) to determine an identity for the instrumentation device. The image may be processed to determine the identity.

The processing may involve pattern recognition or recognition of an identifier for the instrumentation device. The identity may specify a type or model of instrumentation device, for example, by including a model descriptor, such as a model number. The identity may specify a specific instance of the instrumentation device, such as by using a serial number. The identity may be associated (operation 606) with a gateway configured to access the instrumentation device. The gateway may be configured after the identity is determined. The gateway may be associated with an MCDN user account and/or an MCDN client premises. The identity of the instrumentation may be stored at an MCDN server (operation 608) along with information indicative of an association to an MCDN user account. The MCDN user account may be associated with the gateway, which may be located at the MCDN client premises. The gateway may be configured (operation 610) with a communication address for accessing the instrumentation device. The instrumentation device may be accessible via a LAN or a wireless LAN from the gateway using the communication address. In certain embodiments, operation 610 involves sending configuration information, including the communication address, to the gateway from an MCDN server. The gateway may further be configured with commands or other configuration information used to access the instrumentation device via the communication address.

Figure 7:
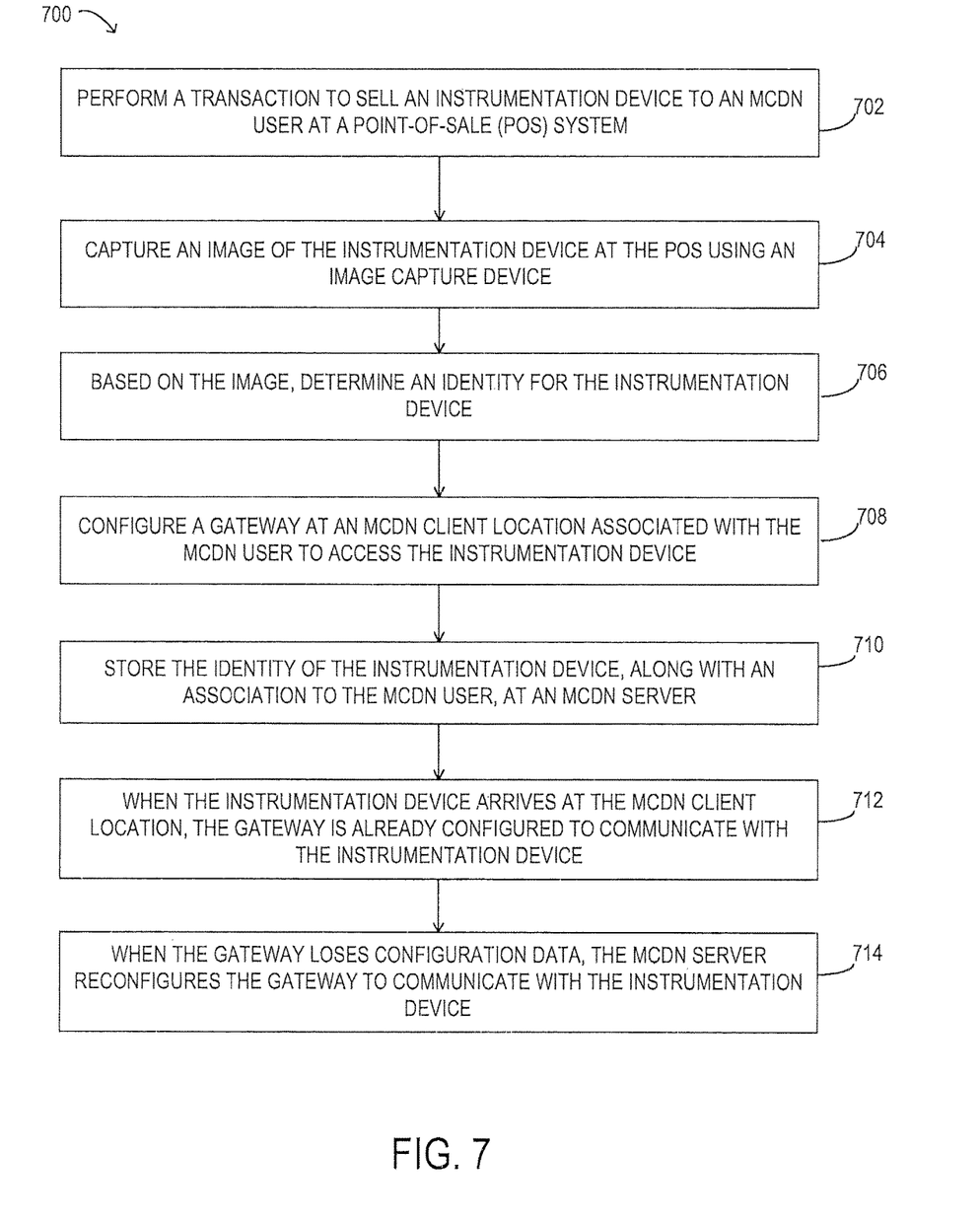
FIG. 7 illustrates selected elements of a second embodiment of an instrumentation device management method.

Advancing now to FIG. 7, selected elements of an embodiment of method 700 for instrumentation device management are illustrated in flow chart form. In one embodiment, method 700 may be performed by registration core 152 (see FIGS. 1, 2) in conjunction with MCDN 100, image capture device 502 (see FIG. 5), and certain external systems, as noted below. Method 700 may also involve functionality provided by instructions 824 executing on computing device 800 (see FIG. 8). It is noted that certain operations described in method 700 may be optional or may be rearranged in different embodiments.

Method 700 may optionally include performing (operation 702) a transaction to sell an instrumentation device to an MCDN user at a POS system. The POS system may be operated by a seller of the instrumentation device. The POS system may be located at a location different than an MCDN client premises associated with the MCDN user. In certain embodiments, the POS system is an Internet website operated by the seller of the instrumentation device.

An image of the instrumentation device may be captured (operation 704) at the POS using an image capture device. In certain instances, operations 702 and/or 704 may be performed at a retail location offering the instrumentation device for sale. The image capture device may belong to either the MCDN user, the seller, or a third-party, such as the proprietor of the retail location or another service provider.

Based on the image, an identity for the instrumentation device may be determined (operation 706). The identity may be determined by sending the image to registration core 152 (see FIG. 1) in operation 706. A gateway at an MCDN client location associated with the MCDN user may be configured (operation 708) to access the instrumentation device. Operation 708 may be performed by registration core 152 in response to receiving the image in operation 706.

The identity of the instrumentation device may be stored (operation 710) at an MCDN server, along with an association to the MCDN user. The association may be indicative of an MCDN user account and/or the gateway. When the instrumentation device arrives at the MCDN client location, the gateway may already be configured (operation 712) to communicate with the instrumentation device. Operation 708 may be performed in advance of operation 712. The instrumentation device may be brought to the MCDN client location by the MCDN user or may be delivered. When the gateway loses configuration data, the MCDN server may reconfigure (operation 714) the gateway to communicate with the instrumentation device. Operation 714 may be repeated numerous times during a service lifetime of the instrumentation device.

Figure 8:
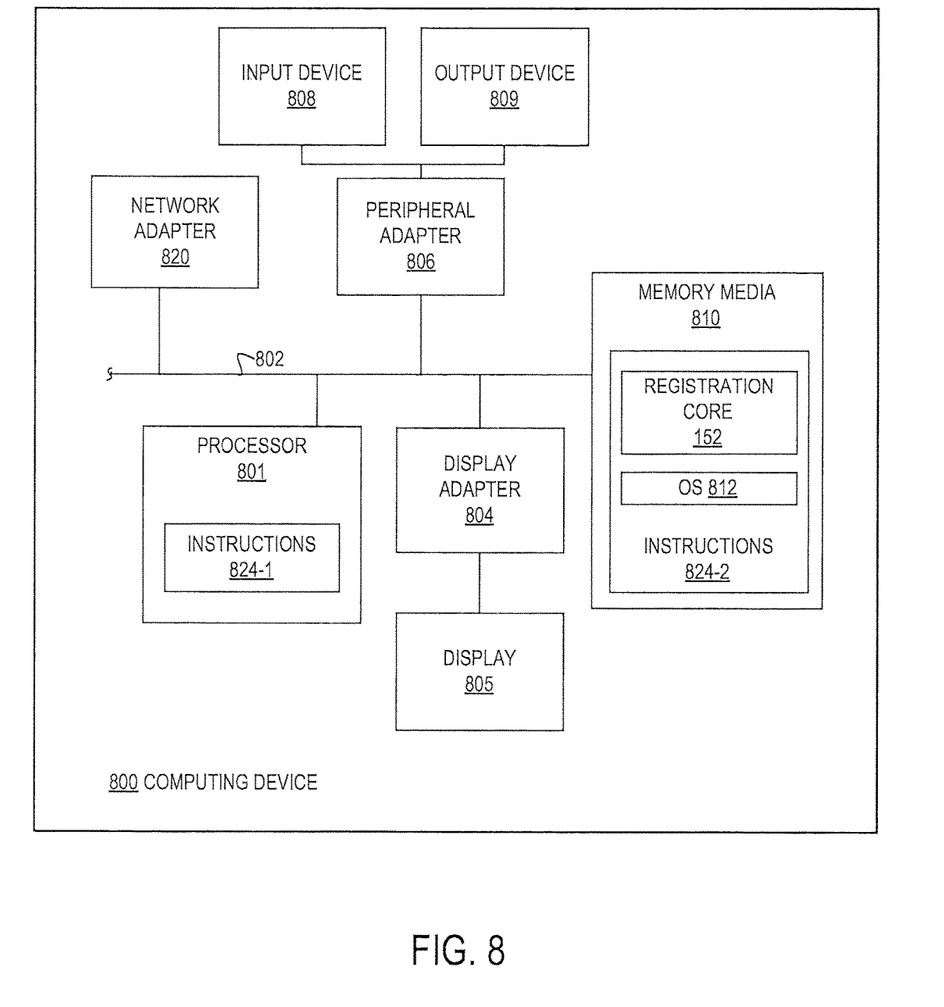
FIG. 8 is a block diagram of selected elements of an embodiment of a computing device.

Referring now to FIG. 8, a block diagram illustrating selected elements of an embodiment of computing device 800 is presented. Computing device 800 may represent an implementation of application server 150 (see FIG. 1) and/or another MCDN server. As shown in FIG. 8, computing device 800 may operate in conjunction with GW 123 (see also FIGS. 2-5) to execute the methods and operations described herein.

In the embodiment depicted in FIG. 8, computing device 800 includes processor 801 coupled via shared bus 802 to storage media collectively identified as memory media 810. Computing device 800, as depicted in FIG. 8, further includes network adapter 820 that interfaces computing device 800 to a network (not shown in FIG. 8), such as switching network 140 (see FIG. 1). In embodiments suitable for use with MCDN 100, computing device 800, as depicted in FIG. 8, may include peripheral adapter 806, which provides connectivity for the use of input device 808 and output device 809. Input device 808 may represent a device for user input, such as a keyboard or a mouse, or even a video camera. Output device 809 may represent a device for providing signals or indications to a user, such as loudspeakers for generating audio signals.

Computing device 800 is shown in FIG. 8 including display adapter 804 and further includes a display device or, more simply, a display 805. Display adapter 804 may interface shared bus 802, or another bus, with an output port for one or more displays, such as display 805. Display 805 may be implemented as a liquid crystal display screen, a computer monitor, a television or the like. Display 805 may comply with a display standard for computer monitors and/or television displays. Standards for computer monitors include analog standards such as VGA, XGA, etc., or digital standards such as DVI and HDMI, among others. A television display may comply with standards such as NTSC, PAL, or another suitable standard. Display 805 may include one or more integrated speakers to play audio content.

In FIG. 8, memory media 810 encompasses persistent and volatile media, fixed and removable media, and magnetic and semiconductor media. Memory media 810 is operable to store instructions, data, or both. Memory media 810 as shown includes sets or sequences of instructions 824-2, namely, an operating system 812 and registration core 152. Operating system 812 may be a UNIX or UNIX-like operating system, a Windows® family operating system, or another suitable operating system. Instructions 824 may also reside, completely or at least partially, within processor 801 during execution thereof. It is further noted that processor 801 may be configured to receive instructions 824-1 from instructions 824-2 via shared bus 802. Registration core 152, as noted previously, may be configured to execute at least certain portions of method 600 (see FIG. 6) and/or method 700 (see FIG. 7).

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A system, comprising:
   a memory that stores instructions;
   a processor that executes the instructions to perform operations, the operations comprising:
   accessing an image and a video taken of an instrumentation device located in a first location different from a second location of a client of a service provider, wherein the image and the video of the instrumentation device are taken and captured at the first location by an image capture device located in the first location;

recognizing an identity pattern in the image of the instrumentation device;
determining an identity for the instrumentation device based on the identity pattern recognized in the image of the instrumentation device and based on the video taken of the instrumentation device, wherein the identity determined based on the identity pattern recognized in the image and the video is utilized to obtain a command specific to the instrumentation device, wherein the identity specifies an instance, a type, and a model of the instrumentation device;
providing an indication of the identity to a registration core to obtain configuration information for the instrumentation device, wherein the indication of the identity is provided to the registration core instead of the image of the instrumentation device;
associating the identity for the instrumentation device with a gateway configured to access the instrumentation device; and
reconfiguring, prior to the instrumentation device arriving at the second location and by utilizing the registration core, the gateway with a communication address for accessing the instrumentation device, wherein the reconfiguring is performed by invoking a reconfiguration of a previously configured instance of the instrumentation device.

2. The system of claim 1, wherein the operations further comprise receiving the image and the video of the instrumentation device from the image capture device.

3. The system of claim 1, wherein the operations further comprise determining the identity for the instrumentation device based on an identifier for the instrumentation device.

4. The system of claim 1, wherein the operations further comprise associating the gateway with a multimedia content distribution network user account.

5. The system of claim 1, wherein the operations further comprise transmitting configuring information, including the communication address, to the gateway.

6. The system of claim 1, wherein the operations further comprise configuring the gateway with the command used to access the instrumentation device via the communication address.

7. The system of claim 1, wherein the operations further comprise storing the identity for the instrumentation device at a server.

8. The system of claim 1, wherein the operations further comprise reconfiguring the gateway to communicate with the instrumentation device when the gateway loses configuration data.

9. The system of claim 1, wherein the operations further comprise registering the instrumentation device by associating the identity for the instrumentation device with the gateway configured to access the instrumentation device.

10. The system of claim 1, wherein the operations further comprise obtaining, based on the identity, the configuration information for the instrumentation device.

11. The system of claim 1, wherein the operations further comprise capturing the image and the video of the instrumentation device.

12. The system of claim 1, wherein the operations further comprise associating a bar code in the image to the identity of the instrumentation device.

13. The system of claim 1, wherein the operations further comprise obtaining, based on the identity, a parameter specific to the instrumentation device.

14. A method, comprising:
receiving an image and a video taken of an instrumentation device located in a first location different from a second location of a client of a service provider, wherein the image and the video of the instrumentation device are taken by an image capture device located in the first location;
recognizing an identity pattern in the image of the instrumentation device;
determining, by utilizing instructions from a memory that are executed by a processor, an identity for the instrumentation device based on the identity pattern recognized in the image of the instrumentation device and based on the video taken of the instrumentation device, wherein the identity determined based on the identity pattern recognized in the image and the video is utilized to obtain a command specific to the instrumentation device, wherein the identity specifies an instance, a type, and a model of the instrumentation device;
providing an indication of the identity to a registration core to obtain configuration information for the instrumentation device, wherein the indication of the identity is provided to the registration core instead of the image of the instrumentation device;
associating the identity for the instrumentation device with a gateway configured to access the instrumentation device; and
reconfiguring, prior to the instrumentation device arriving at the second location and by utilizing the registration core, the gateway with a communication address for accessing the instrumentation device, wherein the reconfiguring is performed by invoking a reconfiguration of a previously configured instance of the instrumentation device.

15. The method of claim 14, further comprising reconfiguring the gateway to communicate with the instrumentation device when the gateway loses configuration data.

16. The method of claim 14, further comprising registering the instrumentation device by associating the identity for the instrumentation device with the gateway configured to access the instrumentation device.

17. The method of claim 14, further comprising obtaining, based on the identity, the configuration information for the instrumentation device.

18. The method of claim 14, further comprising associating a serial number recognized in the image to the identity of the instrumentation device.

19. The method of claim 14, further comprising determining the identity for the instrumentation device based on an identifier for the instrumentation device.

20. A non-transitory computer-readable medium comprising instructions, which, when loaded and executed by a processor, cause the processor to perform operations, the operations comprising:
receiving an image and a video taken of an instrumentation device located in a first location different from a second location of a client of a service provider, wherein the image of the instrumentation device and the video are taken by an image capture device located in the first location;
recognizing an identity pattern in the image of the instrumentation device;
determining an identity for the instrumentation device based on the identity pattern recognized in the image of the instrumentation device, wherein the identity determined based on the identity pattern recognized in the image is utilized to obtain a command specific to the instrumentation device, wherein the identity specifies an instance, a type, and a model of the instrumentation device;

providing an indication of the identity to a registration core to obtain configuration information for the instrumentation device, wherein the indication of the identity is provided to the registration core instead of the image of the instrumentation device;

associating the identity for the instrumentation device with a gateway configured to access the instrumentation device; and reconfiguring, prior to the instrumentation device arriving at the second location and by utilizing the registration core, the gateway with a communication address for accessing the instrumentation device, wherein the reconfiguring is performed by invoking a reconfiguration of a previously configured instance of the instrumentation device.

* * * * *